(12) United States Patent
Parellada Ferrer et al.

(10) Patent No.: US 9,211,532 B2
(45) Date of Patent: Dec. 15, 2015

(54) CATALYST FOR THE HYDROGENATION OF UNSATURATED COMPOUNDS

(75) Inventors: Mª Dolores Parellada Ferrer, Madrid (ES); Manuel López Reyes, Madrid (ES); Luis Serrano Aviles, Madrid (ES)

(73) Assignee: DYNASOL ELASTOMEROS, S.A., Madrid (ES)

( * ) Notice: Subject to any disclaimer, the term of this patent is extended or adjusted under 35 U.S.C. 154(b) by 169 days.

(21) Appl. No.: 13/380,332

(22) PCT Filed: Jun. 21, 2010

(86) PCT No.: PCT/ES2010/070411
§ 371 (c)(1),
(2), (4) Date: Mar. 16, 2012

(87) PCT Pub. No.: WO2010/149812
PCT Pub. Date: Dec. 29, 2010

(65) Prior Publication Data
US 2012/0172550 A1 Jul. 5, 2012

(30) Foreign Application Priority Data
Jun. 22, 2009 (EP) .................................... 09382099

(51) Int. Cl.
*C08C 19/02* (2006.01)
*B01J 31/22* (2006.01)
*C08F 8/04* (2006.01)
*C08F 4/6592* (2006.01)

(52) U.S. Cl.
CPC ............. *B01J 31/2295* (2013.01); *C08C 19/02* (2013.01); *C08F 8/04* (2013.01); *B01J 2231/645* (2013.01); *B01J 2531/46* (2013.01); *C08F 4/65925* (2013.01)

(58) Field of Classification Search
CPC ............. B01J 31/2295; B01J 2231/645; B01J 2531/46; C08C 19/02; C08F 8/04
USPC ................... 502/152; 525/339; 526/160, 170; 556/53
See application file for complete search history.

(56) References Cited

U.S. PATENT DOCUMENTS

| 2,994,644 | A | | 8/1961 | Clay |
| 3,318,803 | A | | 5/1967 | Broughton |
| 3,898,208 | A | | 8/1975 | Krause |
| 4,501,857 | A | | 2/1985 | Kishimoto et al. |
| 4,673,714 | A | | 6/1987 | Kishimoto et al. |
| 5,039,755 | A | | 8/1991 | Chamberlain et al. |
| 5,583,185 | A | * | 12/1996 | Parellada Ferrer et al. ... 525/338 |
| 5,814,709 | A | * | 9/1998 | De Boer et al. ............... 525/337 |

FOREIGN PATENT DOCUMENTS

| CN | 1373008 A | 10/2002 |
| EP | 0 434 469 A2 | 6/1991 |
| EP | 0 601 953 A1 | 6/1994 |
| EP | 0 885 905 A1 | 12/1998 |
| EP | 1 072 606 A1 | 1/2001 |
| ES | 2 185 467 | 4/2003 |
| JP | 1-289805 A | 11/1989 |
| JP | 8-41081 A | 2/1996 |

OTHER PUBLICATIONS

Database WPI Week 200318, Thompson Scientific, London, GB: AN 2003-176026, XP002604704.
Reply to examination report for priority EP application No. EP 09382099 including Brown et al., "Drying liquid hydrocarbons via fractional distillation," *Chemical Engineering Progress*(1970) 66 (8): 54-60.
European Search Report for priority EP application No. EP 09382099 mailed Nov. 3, 2009.
International Search Report (Form PCT/ISA/210) for corresponding International application No. PCT/ES2010/070411 mailed Oct. 21, 2010.

* cited by examiner

*Primary Examiner* — Roberto Rabago
(74) *Attorney, Agent, or Firm* — Gardner Groff Greenwald & Villanueva, PC

(57) ABSTRACT

Homogeneous catalyst based on titanium compounds of the type $(R^1Cp)(R^2Cp)Ti(PhOR^3)_2$, where Cp is a cyclopentadienyl group, $R^1$ and $R^2$ are identical or different alkyl radicals $(C_3-C_{10})$, Ph is a phenyl group and $OR^3$ is an alkoxyl group. Moreover, the invention relates to the use of said catalyst in a method for the hydrogenation of double bonds in unsaturated compounds, preferably polymers and/or copolymers of conjugated dienes, under mild reaction conditions.

19 Claims, No Drawings

CATALYST FOR THE HYDROGENATION OF UNSATURATED COMPOUNDS

This application is a National Stage Application of PCT/ES2010/070411, filed 21 Jun. 2010, which claims priority to European patent application 09382099.1 filed 22 Jun. 2009. A claim of priority to all, to the extent appropriate is made.

This invention relates to a homogeneous hydrogenation catalyst based on titanium compounds of the type $(R^1Cp)(R^2Cp)Ti(PhOR^3)_2$, where Cp is a cyclopentadienyl group, $R^1$ and $R^2$ are identical or different alkyl radicals ($C_3$-$C_{10}$), Ph is a phenyl group and $OR^3$ is an alkoxyl group, and the decomposition products whereof are easy to eliminate. Moreover, the invention relates to the use of said catalyst in a method for the hydrogenation of double bonds in unsaturated compounds, preferably polymers and/or copolymers of conjugated dienes, under mild reaction conditions.

PRIOR STATE OF THE ART

Numerous catalysts for the hydrogenation of compounds containing unsaturated double bonds are known, which may be classified in two groups:

1) Heterogeneous catalysts, which generally consist of a metal (Ni, Pd, Ru, etc.) deposited on a support (silica, alumina, calcium carbonate, etc.) and 2) Homogeneous catalysts, such as: (a) Ziegler catalysts, which consist of a combination of an organic salt of Ni, Co, Fe, Cr, etc., and a reducing agent such as an organoaluminum compound or similar, and (b) organometallic compounds of Ru, Rh, Ti, La, etc.

Heterogeneous hydrogenation catalysts are widely used in industry, although they are less active when compared to homogeneous catalysts and require the use of significant quantities. Furthermore, they need relatively high pressure and temperature conditions. In general, homogeneous catalysts are more active and require small quantities of catalyst under medium pressure and temperature conditions. However, the most important disadvantage of homogeneous catalysts is their low stability. Moreover, separation of the catalyst or the decomposition products thereof from the hydrogenated products may be difficult and costly.

Polymers of conjugated dienes, such as 1,3-butadiene and isoprene, and copolymers of these dienes with vinyl aromatic monomers, such as, for example, styrene, are widely used in industry as elastomers. These polymers contain double bonds in their chains that allow for vulcanisation, but the presence whereof results in a lower ageing resistance and greater ease of polymer oxidation. Some block copolymers of conjugated dienes and vinyl aromatic hydrocarbons are used, without vulcanization, as thermoplastic elastomers, transparent impact-resistant resins, or polystyrene and polyolefin modifiers or compatibilisers. These copolymers have a limited resistance to atmospheric ageing and oxygen and ozone oxidation, due to the presence of double bonds in the copolymer chain. Therefore, the use of these copolymers in applications that require exposure to the environment is limited. The resistance to oxygen and ozone oxidation, and, in general, the ageing resistance, may be considerably increased by hydrogenating these polymers to achieve total or partial double bonds saturation. Numerous processes have been proposed for the hydrogenation of polymers containing these olefinic double bonds. In general, two types of processes are used: (a) those that use supported heterogeneous catalysts, such as those mentioned above, and (b) those that use Ziegler-type homogeneous catalysts or rhodium or titanium organometallic compounds.

In the case of supported heterogeneous catalysis processes, the polymer that is to be hydrogenated is first solved in a suitable solvent and placed in contact with hydrogen in the presence of the heterogeneous catalyst. Contact between the reagents and the catalyst is difficult due to the relatively high viscosity of the polymer solution, steric hindrances in the polymer chain and the high adsorption of the polymer, which, once hydrogenated, tends to remain on the surface of the catalyst, thereby preventing the passage of other polymer chains to be hydrogenated to the active centres. Therefore, in order to achieve complete hydrogenation of the double bonds, large quantities of catalyst and severe reaction conditions are required, which normally leads to polymer decomposition and gelation. Moreover, when hydrogenating copolymers of conjugated dienes with vinyl aromatic hydrocarbons, the aromatic units are also hydrogenated, and it is difficult to perform a selective hydrogenation of the unsaturations in the polydiene units. Likewise, physical separation of the catalyst from the hydrogenated polymer solution is extremely difficult and, in some cases, complete elimination is impossible due to the high adsorption of the polymer onto the heterogeneous catalyst.

In those processes that use Ziegler-type catalytic systems, the reaction substantially takes place in a homogeneous medium, and, consequently, the hydrogenation may be performed under mild pressure and temperature conditions. Moreover, by adequately selecting the reaction conditions, it is possible to selectively hydrogenate the double bonds in the polydiene units and not hydrogenate the aromatic rings in the copolymers of conjugated dienes with vinyl aromatic hydrocarbons. However, elimination of the catalyst residues from the reaction products (which is absolutely necessary, since these residues have a negative impact on the hydrogenated polymer's stability) may be a difficult, costly step. Other processes that use homogeneous catalysts, such as, for example, the rhodium compounds disclosed in U.S. Pat. No. 3,898,208 and in patent JP 01,289,805, have the disadvantage of the high cost of the catalyst itself.

It is well known that hydrogenation catalysts wherein one of the components is a derivative of titanium cyclopentadienyl (U.S. Pat. No. 4,501,857) are used (necessarily in the presence of organolithium compounds) for the hydrogenation of olefinic double bonds in polymers of conjugated dienes. U.S. Pat. No. 5,039,755 discloses the hydrogenation of polymers prepared by means of an organolithium compound and finished by the addition of hydrogen. The presence of lithium hydride, formed in the final reaction, is necessary, and acts as a reducing agent. Both patents use $Cp_2TiCl_2$, which is barely soluble in organic solvents and which, due to the presence of chlorides, may lead to corrosion of the reaction installation. Furthermore, the process described entails the use of high catalyst concentrations and, for this reason, is not economically favourable.

Likewise, U.S. Pat. No. 4,673,714 specifies the use of $Cp_2TiR_2$ (where R is an alkylaryl group) as a catalyst capable of selectively hydrogenating double bonds in polymers and copolymers of conjugated dienes in the absence of organolithium compounds.

On the other hand, patent EP 0,434,469 A discloses the use of an extremely complex catalytic system, which comprises a combination of a titanium bis(cyclopentadienyl) compound with an aluminum or magnesium organometallic compound and alkali metals in the presence of alkali metal alkoxides and polar compounds such as ether, ketone, sulfoxide, etc., Said catalytic system is capable of hydrogenating the double bonds of polymers and copolymers of conjugated dienes.

Patent EP 0,601,953 B1 discloses the use of titanium bis (cyclopentadienyl) compounds, with the formula $Cp_2Ti(PhOR)_2$, where OR is an alkoxide group, or the formula $Cp_2TiR_2$, where R is a —$CH_2PPH_2$ group, both with great stability, capable of selectively hydrogenating the dienic double bonds of polymers and copolymers of conjugated dienes under mild reaction conditions, with low catalyst consumption and without the need for reducing agents.

But the use of catalysts of the titanium bis(cyclopentadienyl) type entails the existence, following the decomposition of the catalyst, of compounds such as cyclopentadiene, which is difficult to separate from the solvent and, therefore, adversely affects other steps in the process.

U.S. Pat. No. 5,814,709 discloses the use of the catalyst with the general formula $(R^1Cp)(R^2Cp)TiR^3R^4$, with substituted or non-substituted cyclopentadienyls or indenyls, but the activity whereof is once again subject to the use of reducing agents, such as metal hydride and a boron compound. Likewise, patent ES 2,185,467 A1 discloses a complex catalytic composition that comprises a titanium compound, at least one silane and at least one aluminum, lithium, magnesium or zinc organometallic compound. The titanium compound is of the type $(Cp^*)_2TiR^1R^2$, where $Cp^*$ represents a cyclopentadienyl group or a derivative with the formula $C_5R_5$, and $R_5$ represents an H atom or an alkyl, arylalkyl or aryl group.

In addition, patent CN 1,373,008 discloses the use of catalysts with the general formula $(R^1Cp)(R^2Cp)TiR^3R^4$, where $R^1$ and/or $R^2$ are an alkyl ($C_1$-$C_8$), cycloalkyl or aryl group; $R^3$ and/or $R^4$ are an alkyl ($C_6$-$C_{12}$), alkoxyl, aryl or aryloxyl group; and M is a transition metal selected from titanium, zirconium and hafnium. The hydrogenation takes place on the living polymer, which is de-activated by reaction with hydrogen; the disadvantages are the time required to complete the reaction with hydrogen and the need to adjust the quantity of LiH formed (molar ratio between lithium hydride and titanium of 4 to 20), which is too small for high molecular weight polymers and too large for low molecular weight polymers.

The process commonly used in industry to produce hydrogenated polymers normally has the following steps:

a) solution polymerisation of the monomers in the presence of lithium alkyl, to produce (co)polymers of conjugated dienes, b) addition of a de-activating compound of the alcohol, phenol or chlorosilane type to the reaction mixture, c) addition of a hydrogenation catalyst to the de-activated polymer solution (b) in the presence of hydrogen, d) addition of water and steam to hydrogenated polymer solution (c) and elimination of the solvent by evaporation, separating the water and drying the polymer, and e) purification of the recovered solvent to be re-utilised in a new polymerisation and hydrogenation cycle.

During step (d), the catalysts used are generally derived from titanium cyclopentadienyl and are easily hydrolised, resulting in cyclopentadiene, which is to a large extent dragged by the solvent. During the solvent purification step, most of the cyclopentadiene is not separated from the solvent, thereby impurifying it, which creates a problem when the solvent is re-utilised in a new polymerisation and hydrogenation cycle.

The cyclopentadiene contained in the solvent reacts with the polymerisation initiator, usually a lithium alkyl (n-butyl lithium, sec-butyl lithium), which makes it impossible to know the quantity of active initiator for the polymerisation, leading to polymers with viscosities outside the required specifications. Moreover, the reaction of the lithium initiator with cyclopentadiene results in significant concentrations of lithium salts, which leads to increased basicity of the polymer solution, whereto antioxidant compounds are added in order to protect the final product. It is well known that the stability of phenolic-type antioxidants is reduced in the presence of a basic medium and, during their degradation, they generate quinone-type compounds, with a strong colouring. This adversely affects the polymer's final colour.

In order to have more advantageous, favourable, economical hydrogenation processes, industry today needs more effective homogeneous catalysts that are stable, simple and active, and the use whereof is sufficiently low concentrations to prevent steps designed to remove catalyst residues from the hydrogenated polymer, and the process flows susceptible of being used again in the polymerisation and hydrogenation reactions.

DESCRIPTION OF THE INVENTION

This invention relates to a homogeneous hydrogenation catalyst based on titanium compounds of the type $(R^1Cp)(R^2Cp)Ti(PhOR^3)_2$, where Cp is a cyclopentadienyl group, $R^1$ and $R^2$ are identical or different alkyl radicals ($C_3$-$C_{10}$), Ph is a phenyl group and $OR^3$ is an alkoxyl group. Moreover, the invention relates to the use of said catalyst in a method for the hydrogenation of double bonds of compounds, more preferably, polymers and copolymers of conjugated dienes, under mild reaction conditions.

In order to avoid all the disadvantages described in regards to the catalysts found in the state of the art, as well as the disadvantages arising from the production process of hydrogenated polymers commonly used in industry, the authors of the invention have surprisingly discovered that homogeneous titanium catalysts, with the general formula $(R^1Cp)(R^2Cp)Ti(PhOR^3)_2$, are highly soluble in organic solvents, have a high activity in the absence of reducing agents, and the decomposition products generated during the manufacturing process of hydrogenated polymers are easy to eliminate. Basically, these catalysts are very active in polymer hydrogenation and, moreover, their hydrolysis products, which are formed during the polymer isolation step, $R^1CpH$, $R^2CpH$ and $HPhOR^3$, have a high boiling point, much higher than that of cyclopentadiene and that of the solvent, usually cyclohexane (b.p. 80° C.) ($R^1CpH$, $R^2CpH$: 5-iPrCpH, b.p. (cal.) 123° C., 5-nBuCpH, b.p. (cal.) 146° C., etc.; $HPhOR^3$: anisole, b.p. 154° C.; ethoxybenzene, b.p. 170° C.). This allows easy separation by distillation, resulting in a pure solvent that may be used in a new polymerisation and hydrogenation cycle.

The new family of catalysts of the invention introduces, amongst others, the following improvements or advantages, as compared to the above-mentioned process used in the state of the art:

1. More economical process, due to the savings in polymerisation initiator consumption. Using the new family of catalysts of the invention, the solvent used in the manufacturing process of hydrogenated rubbers is a pure solvent that does not contain cyclopentadiene as an impurity and consumes lithium alkyl (polymerisation initiator).

2. Greater stability in the polymerisation and hydrogenation process, due to a better control over the level of impurities in the solvent, which makes it possible to increase the productivity. The quantities of cyclopentadiene contained in a solvent due to the use of catalysts of the titanium bis(cyclopentadienyl) type increase with the number of times that the solvent is re-utilised, which makes it difficult to control the level of impurities. The absence of cyclopentadiene in the solvent, when using the new family of catalysts of the invention, makes it easier to control the level of impurities, regardless of the number of solvent re-utilisation cycles.

3. Increased quantity of product that meets the quality requirements (fulfilment of the specification), due to the absence of by-products arising from the decomposition of the catalyst in the solvent.

4. Increased final product quality, due to an improved colour.

On the other hand, the catalysts of this invention have the additional advantage that they are very stable and maintain their activity for several months after being prepared.

Below we include some definitions of the terms used, which refer to their meaning in this invention:

"Alkyl" refers to linear or branched aliphatic chains, which have between 3 and 10 carbon atoms; for example, n-propyl, i-propyl, n-butyl, sec-butyl, n-pentyl, etc. Preferably, the alkyl group has between 3 and 6 carbon atoms.

"Alkoxyl" refers to a group with the formula —$OR^3$, where $R^3$ is an alkyl ($C_1$-$C_4$); for example, methoxyl, ethoxyl, propoxyl, etc. Preferably, the alkoxyl is methoxyl or ethoxyl.

"Alkylstyrene" refers to a styrene group that is substituted with an alkyl group ($C_1$-$C_{10}$), as defined above, at position 4.

Therefore, a first aspect of this invention relates to a homogeneous hydrogenation catalyst for the hydrogenation of unsaturated compounds (hereinafter catalyst of the invention), with the general formula:

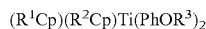

$$(R^1Cp)(R^2Cp)Ti(PhOR^3)_2$$

where:
Cp refers to a cyclopentadienyl;
$R^1$ and $R^2$ are identical or different alkyl groups ($C_3$-$C_{10}$);
Ph refers to a phenyl group; and
$OR^3$ is an alkoxyl group ($C_1$-$C_4$).

In a preferred embodiment, $R^1$ and $R^2$ are identical or different alkyl groups ($C_3$-$C_6$). In another preferred embodiment, $OR^3$ is a methoxyl or ethoxyl group.

Specific examples of catalysts of the invention include, without being limited thereto, the following compounds:
titanium bis(n-propylcyclopentadienyl)-bis(4-methoxyphenyl),
titanium bis(n-propylcyclopentadienyl)-bis(4-ethoxyphenyl),
titanium bis(n-propylcyclopentadienyl)-bis(3-methoxyphenyl),
titanium bis(n-propylcyclopentadienyl)-bis(3-ethoxyphenyl),
titanium bis(isopropylcyclopentadienyl)-bis(4-methoxyphenyl),
titanium bis(isopropylcyclopentadienyl)-bis(4-ethoxyphenyl),
titanium bis(isopropylcyclopentadienyl)-bis(3-methoxyphenyl),
titanium bis(isopropylcyclopentadienyl)-bis(3-ethoxyphenyl),
titanium bis(n-butylcyclopentadienyl)-bis(4-methoxyphenyl),
titanium bis(n-butylcyclopentadienyl)-bis(4-ethoxyphenyl),
titanium bis(n-butylcyclopentadienyl)-bis(3-methoxyphenyl),
titanium bis(n-butylcyclopentadienyl)-bis(3-ethoxyphenyl),
titanium bis(n-pentylcyclopentadienyl)-bis(4-methoxyphenyl),
titanium bis(n-pentylcyclopentadienyl)-bis(4-ethoxyphenyl),
titanium bis(n-pentylcyclopentadienyl)-bis(3-methoxyphenyl),
titanium bis(n-pentylcyclopentadienyl)-bis(3-ethoxyphenyl),
titanium bis(n-hexylcyclopentadienyl)-bis(4-methoxyphenyl),
titanium bis(n-hexylcyclopentadienyl)-bis(4-ethoxyphenyl),
titanium bis(n-hexylcyclopentadienyl)-bis(3-methoxyphenyl),
titanium bis(n-hexylcyclopentadienyl)-bis(3-ethoxyphenyl),
titanium (n-propylcyclopentadienyl) (n-butylcyclopentadienyl)-bis(4-methoxyphenyl),
titanium (n-butylcyclopentadienyl) (n-pentylcyclopentadienyl)-bis(4-methoxyphenyl),
titanium (isopropylcyclopentadienyl) (n-butylcyclopentadienyl)-bis(4-methoxyphenyl),
titanium (n-propylcyclopentadienyl) (n-butylcyclopentadienyl)-bis(4-ethoxyphenyl),
titanium (n-butylcyclopentadienyl) (n-pentylcyclopentadienyl)-bis(3-methoxyphenyl) or
titanium (isopropylcyclopentadienyl) (n-butylcyclopentadienyl)-bis(3-ethoxyphenyl).

In an even more preferred embodiment, the catalyst of the invention has the formula titanium bis(n-butylcyclopentadienyl)-bis(4-methoxyphenyl).

A second aspect of this invention relates to the use of the catalyst of the invention for the hydrogenation of an unsaturated compound. Preferably, these compounds are polymers or copolymers that contain unsaturated bonds and, more preferably, dienic polymers or copolymers.

The dienic polymers or copolymers that may be hydrogenated in accordance with this invention may be obtained by polymerisation methods known in the state of the art, such as anionic polymerisation, cationic polymerisation, co-ordination polymerisation, radical polymerisation, etc., in solution, emulsion or mass processes. Anionic polymerisation is particularly useful to produce polymers and copolymers that may be hydrogenated in accordance with the invention; the preferred initiators to be used are lithium alkyls, which are known by any person skilled in the art, such as, for example, n-butyl lithium, sec-butyl lithium, etc.

A third aspect of this invention relates to a method for the hydrogenation of polymers (or copolymers) that contain unsaturated bonds (hereinafter method of the invention), which comprises:

a) solution polymerisation of the monomers in an inert solvent, in the presence of an lithium alkyl, to produce polymers or copolymers that contain unsaturated bonds;

b) addition of a de-activating compound, selected from the list comprising alcohol, phenol and chlorosilane, to the polymer that is to be hydrogenated, and c) addition of a catalyst to the solution of step (b), in the presence of hydrogen ($H_2$).

The catalyst's decomposition products have a boiling point equal to or greater than 123° C. The catalysts of the invention are active in the presence of hydrogen and do not require the presence of a reducing compound.

In a preferred embodiment of the method of the invention, the inert solvent is an aliphatic or cycloaliphatic hydrocarbon, an ether or an aromatic hydrocarbon. More preferably, this solvent is selected from the list comprising n-hexane, n-octane, isooctane, cyclohexane, methylcyclopentane, tetrahydrofuran, benzene, toluene, xylene, ethylbenzene or any of the combinations thereof.

In another preferred embodiment of the method of the invention, the hydrogenation takes place at temperatures between 50° C. and 140° C., with a hydrogen pressure between 4 bar and 25 bar.

The quantity of catalyst used is not critical, and may widely vary, although it must be between 0.001 and 10 mmoles per 100 g of polymer to be hydrogenated. Above 10 mmoles per 100 g of polymer to be hydrogenated, the hydrogenation is effective but anti-economical, and may require a separation step for the catalyst residues. In another, more preferred embodiment of the method of the invention, the quantity of catalyst used is between 0.01 and 2 mmol per 100 g of polymer to be hydrogenated.

Preferably, the polymers or copolymers containing unsaturated bonds used in the hydrogenation method of the invention are dienic polymers or dienic copolymers, which, more preferably, contain vinyl aromatic hydrocarbons. These polymers are characterised in that the average molecular weight ($M_w$) is between approximately 500 g/mol and 1,000,000 g/mol.

In another preferred embodiment of the method of the invention, the polymer to be hydrogenated is a copolymer consisting of: (a) at least one monomer from a group comprising 1,3-butadiene and/or isoprene; and (b) at least one monomer from a group comprising styrene, α-methylstyrene, 4-alkylstyrene or any of the combinations thereof.

In another preferred embodiment of the method of the invention, the copolymer is a statistical copolymer wherein the co-monomers are randomly distributed along the polymer chain, a graft copolymer or a pure or gradual block copolymer. More preferably, these copolymers are formed by: (a) at least styrene and/or 4-alkylstyrene, and (b) at least butadiene and/or isoprene.

In a more preferred embodiment of the method of the invention, the copolymer is a linear, branched, radial block copolymer or any of the combinations thereof, or a star-block copolymer. Star-block copolymers may be obtained by the coupling of a linear block copolymer with coupling agents. Block copolymers are particularly interesting, since some of them are thermoplastic elastomers that are useful from the industrial standpoint.

In an even more preferred embodiment of the method of the invention, the copolymer is a block copolymer that contains at least one polymer block A consisting of styrene, 4-alkylstyrene or the mixtures thereof, and at least one polymer block B consisting of 1,3-butadiene, isoprene or the mixtures thereof.

In another preferred embodiment of the method of the invention, the proportion of block A of the copolymer is between 10% and 90% of the final copolymer by weight and the proportion of 1,2-vinyl units in block B is between 8% and 90% of block B by weight.

When block copolymers of these characteristics are hydrogenated, the polydiene blocks are converted into polyolefinic blocks, such that the copolymers behave as thermoplastic elastomers, with greater stability toward oxidation and ageing.

The hydrogenation reaction may be performed in stirred tank-type reactors and also in loop-type reactors wherein the liquid mixture to be hydrogenated is extracted from the reactor and made to recirculate, by means of a pump, through a heat exchanger and re-introduced into the reactor, where it is placed in contact with hydrogen. In another preferred embodiment of the method of the invention, the hydrogenation reaction is performed as a batch, continuous or semi-continuous reaction.

In another, more preferred embodiment of the method of the invention, over 95% of the 1,3-butadiene or isoprene units are hydrogenated and, due to the high selectivity of the catalyst of the invention, the aromatic nuclei are not appreciably hydrogenated (less than 1% of the styrene or alkylstyrene units). In certain cases, it may be desirable to partially hydrogenate the double bonds, over 50% of the 1,3-butadiene or isoprene units. This may be easily achieved within the framework of the invention, by adequately selecting the reaction conditions; catalyst type and concentration, temperature, hydrogen pressure, reaction time, etc.

Furthermore, this invention relates to a selective control of the degree of hydrogenation of the unsaturated bonds in accordance with the procedure of this invention. The control of the degree of hydrogenation can be carried out by well-known analytical techniques, like Nuclear Magnetic Resonance Spectroscopy (NMR) or Infrared Spectroscopy (IR). Preferably, the selective control of the hydrogenation degree is carried out by NMR.

Therefore, in another preferred embodiment of the method of the invention, the hydrogenation is carried out selectively on at least:
  i. more than 50% of the unsaturated bonds of the 1,3-butadiene or isoprene units, preferably more than 95%, and
  ii. less than 1% of the unsaturated bonds of the styrene or 4-alkylstyrene units.

In another embodiment of the method of the invention, the hydrogenation is carried out selectively:
  i. between 50% and 99.9% of the unsaturated bonds of the 1,3-butadiene or isoprene units, preferably between 95% and 99.9%, and
  ii. between 0.01% and 1% of the unsaturated bonds of the styrene or 4-alkylstyrene units.

The partially hydrogenated dienic polymers may have interesting applications as compatibilising agents in polymers mixtures, as additives to improve the processability of rubbers and as additives to improve the freezing point of lubricating oils.

The hydrogenated products obtained by the method of the invention may be separated from the solvent by processes known by those skilled in the art, such as, for example, distillation, precipitation, etc. In particular, the hydrogenated polymers and/or copolymers may be separated from the solvent by several methods known to those skilled in the art, such as, for example, without being limited thereto, the following:

1. By contact between the hydrogenated solution and polar solvents such as acetone or methanol, which, since they are poor solvents of the polymer, causes the precipitation and allows the physical separation thereof.

2. By contact between the hydrogenated solution and water and steam, and eliminating the solvent by evaporation, separating the water and drying the polymer.

3. By direct evaporation of the solvent.

Throughout the description and the claims, the word "comprises" and the variants thereof are not intended to exclude other technical characteristics, additives, components or steps. For those skilled in the art, other objects, advantages and characteristics of the invention will arise partly from the description and partly from the practise of the invention. The following examples are provided for illustrative purposes, and are not intended to limit this invention.

EXAMPLES

The invention will be illustrated below by means of assays performed by the inventors, which prove the specificity and effectiveness of the catalyst of the invention.

A. Catalysts of the Invention

Example 1

Preparation of the Catalysts

All the operations were performed in a nitrogen or argon atmosphere, following conventional Schlenk techniques.

THF was dried by distillation on sodium and benzophenone, and hexane and toluene were dried by distillation on sodium metal. All the solvents were degasified prior to use.

a) Preparation of the catalyst precursor $(R^1Cp)(R^2Cp)TiCl_2$:

a.1.) The catalyst precursor $(iPrCp)_2TiCl_2$ was obtained from Sigma-Aldrich and used as received.

$^1$H NMR (CDCl$_3$, 298 K, 500 MHz): δ 6.42 (m, 4H), 6.35 (m, 4H), 3.25 (sept, 2H), 1.58 (m, 4H), 1.23 (d, 12H).

a.2.) Preparation of the catalyst precursor $(nBuCp)_2TiCl_2$. Preparation de nBuCpH 575 ml of 2.4 M CpNa (1.38 mol) and 1.03 g of NaI (6.87 mmol) are added in a 1 L flask, previously conditioned by means of nitrogen and vacuum cycles. After stirring the mixture for 10 minutes, the temperature is lowered to 8° C. and 148.5 ml of 1-bromobutane (1.38 mol) are slowly added, ensuring that the internal reaction temperature does not exceed 15° C. The reaction mixture is maintained at room temperature for 6 h and the THF is eliminated under vacuum at 25° C. to constant weight. Subsequently, the suspension is extracted with 300 ml of hexane. The hexane is eliminated from the filtered solution under vacuum at 25° C. until the weight of the residue reaches 168 g (the theoretical weight) or constant weight.

The residue is distilled in a Vigreux column under vacuum, first at 40° C. and subsequently raising the temperature to 110° C. The product is a mixture of isomers, according to the NMR results.

Yield: 77.3 g, 46%.

Preparation of nBuCpNa and $(nBuCp)_2TiCl_2$

In a 250 ml flask, previously conditioned by means of nitrogen and vacuum cycles, 3.62 g of HNa 60% dispersion in mineral oil is added (89.87 mmol), which is washed with 40 ml of hexane, and 35 ml of dry THF is added. A solution of 11.55 g of BuCpH (94.6 mmol) in 35 ml of dry THF is slowly added to this suspension at 25° C. The temperature is raised to 50° C. and it is left to react for 3 additional hours, after which all the HNa has been consumed and no release of H$_2$ is observed in the bubbler. After this time, the reaction mixture is cooled to −15° C. and 4.70 ml of TiCl$_4$ (42.57 mmol) is slowly added. Once the addition is concluded, the suspension is left to react for 12 h, generating a suspension with an deep red colour. After this time, the solvent is eliminated to dryness. 150 ml of dry toluene is added to the reaction mixture, and it is stirred for 15 minutes at 35° C., and filtered at the same temperature. The solvent is taken to dryness and the resulting intense red solid is washed at −15° C. with 40 ml of hexane and dried under vacuum for at least 8 h.

Yield: 10.3 g, 67%.

$^1$H NMR (CDCl$_3$, 298 K, 500 MHz): δ 6.41 (m, 4H), 6.34 (m, 4H), 2.72 (t, 4H), 1.58 (m, 4H), 1.38 (m, 4H), 0.94 (t, 6H).

b) Preparation of the catalyst $(R^1Cp)(R^2Cp)Ti(Ph-4-OMe)_2$ 22.5 ml of a 0.5 M solution of 4-methoxyphenyl magnesium bromide (11.25 mmol) are added in a 50-ml Schlenk flask, conditioned by means of nitrogen and vacuum cycles. The solution is cooled to 10° C. and 5.1 mmol of the precursor prepared in section a), $(R^1Cp)(R^2Cp)TiCl_2$, are added, gradually in portions, such that the internal temperature does not exceed 25° C. Once the addition is concluded, the suspension is kept under stirring for 1 h at 20° C.-22° C. The solvent is eliminated to dryness and a mixture of 19 ml of ethylbenzene and 1 ml of THF is added to the resulting residue. It is stirred for 15 min, filtered, and the resulting deep red solution is used for the hydrogenation reactions.

$(nBuCp)_2Ti(Ph-4-OMe)_2$: $^1$H NMR (C$_6$D$_6$, 298 K, 500 MHz): δ 7.04 (d, 4H), 6.77 (d, 4H), 6.06 (m, 4H), 5.91 (m, 4H), 3.52 (s, 6H), 1.98 (t, 4H), 1.34 (m, 4H), 1.23 (m, 4H), 0.84 (t, 6H).

$(iPrCp)_2Ti(Ph-4-OMe)_2$: $^1$H NMR (C$_6$D$_6$, 298 K, 500 MHz): δ 7.05 (d, 4H), 6.78 (d, 4H), 6.05 (m, 4H), 6.00 (m, 4H), 3.50 (s, 6H), 2.21 (sept, 2H), 0.96 (d, 12H).

B. Hydrogenation of Polymers

The polymers to be hydrogenated were prepared by anionic polymerisation in cyclohexane, using n-butyl lithium as the initiator and tetrahydrofuran or diethoxypropane as polar modifiers. The monomers used were styrene and 1,3-butadiene. A part of the polymer was isolated from the solution to be analysed, and the polymer's microstructure was determined by $^1$H-NMR, whereas the molecular weight and the polydispersity index were measured by gel permeation chromatography (GPC).

Hydrogenation of the polymers was performed in an autoclave reactor with a 2 L inner capacity, with a control system for the temperature, stirring and hydrogen flowmeter, as well as nitrogen and hydrogen inlets, venting and polymer solution input. The polymer's hydrogenation percentage was analysed by $^1$H-NMR.

Example 2

Hydrogenation of Styrene-Butadiene Diblock Copolymer with $(nBuCp)_2Ti(Ph-4-OMe)_2$ A styrene-butadiene (SB) copolymer at a 5%-weight concentration in cyclohexane is prepared in a 2 L-capacity reactor by the sequential addition of the monomers, using tetrahydrofuran (THF) as the polar modifier and finishing the living polymer with 1.13 mmol of 2,6-di-tert-butyl-4-methylphenol (BHT). Once a part of the polymer has been isolated, its composition by weight is analysed, with the following result: styrene (30%) and butadiene (70%) (vinyl content in polybutadiene: 35%), with Mw=60,000 g/mol and polydispersity index=1.1.

The polymer solution is heated to 90° C. and, subsequently, 0.25 mmol of the titanium bis(n-butylcyclopentadienyl)-bis (4-methoxyphenyl) catalyst per 100 g of polymer is added. The synthesis of the catalyst is described in Example 1b. The autoclave is pressurised with hydrogen to 10 bar, and a significant consumption thereof is observed, whilst the temperature of the solution rises to 125° C. After 50 minutes, the reaction medium ceases to consume hydrogen and the hydrogenation reaction is considered to be concluded. The reactor is cooled and de-pressurised, and the resulting polymer is separated from the solvent by precipitation in a water-steam mixture, which in turn recovers the solvent. The precipitated polymer is oven dried and its microstructure analysed by $^1$H-NMR, which indicates that 99.7% of the original butadiene unsaturations are hydrogenated, whereas the styrene unsaturations remain intact; the molecular weight is determined by GPC and indicates that there is no polymer degradation.

The recovered solvent is analysed by the gas chromatography FID detector technique, and no catalyst decomposition products are detected with boiling points below 123° C.

Example 3

Hydrogenation of Styrene-Butadiene Diblock Copolymer with $(iPrCp)_2Ti(Ph-4-OMe)_2$ Using the same polymerisation process as in Example 2, a styrene-butadiene diblock copolymer is prepared, which is subsequently hydrogenated with 1.19 mmol of the titanium bis(isopropylcyclopentadienyl)-bis-(4-methoxyphenyl) catalyst per 100 g of polymer. The synthesis of the catalyst is described in Example 1b. The method and operating conditions for the hydrogenation reaction are the same as in Example 2.

After 30 minutes of reaction, the reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 95.8% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and no catalyst decomposition products are detected with boiling points below 123° C.

Example 4

Hydrogenation of Styrene-Butadiene Diblock Copolymer with (nBuCp)$_2$Ti(Ph-4-OMe)$_2$ at a Low Concentration Using the same polymerisation process as in Example 2, a styrene-butadiene diblock copolymer is prepared, which is subsequently hydrogenated with only 0.17 mmol of the titanium bis(n-butylcyclopentadienyl)-bis(4-methoxyphenyl) catalyst per 100 g of polymer. The method and operating conditions for the hydrogenation reaction are the same as in Example 2.

After 55 minutes, the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 99.0% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and no catalyst decomposition products are detected with boiling points below 123° C.

Example 5

Hydrogenation of Styrene-Butadiene Radial Copolymer

Using the same polymerisation process as in Example 2, a four-branch styrene-butadiene copolymer (SB)$_4$ is synthesised by the sequential addition of the monomers, using tetrahydrofuran (THF) as the polar modifier, and coupling the living polymer with tetrachlorosilane (SiCl$_4$). The polymer composition by weight is: styrene (30%) and butadiene (70%) (vinyl content in polybutadiene: 21%), with Mw=160,000 g/mol, polydispersity index=1.39 and degree of coupling=87%.

The hydrogenation reaction of the resulting polymer solution is performed with only 0.25 mmol of the titanium bis(n-butylcyclopentadienyl)-bis-(4-methoxyphenyl) catalyst per 100 g of polymer. The method and operating conditions for the hydrogenation reaction are the same as in Example 2.

After 55 minutes, the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 99.9% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and no catalyst decomposition products are detected with boiling points below 123° C.

Example 6

Hydrogenation of High-Vinyl Styrene-Butadiene Diblock Copolymer

Using the same polymerisation process as in Example 2, a high-vinyl styrene-butadiene linear diblock copolymer (SB) is synthesised by the sequential addition of the monomers, using diethoxypropane as the polar modifier. The polymer composition by weight is: styrene (30%) and butadiene (70%) (vinyl content in polybutadiene: 62%), with Mw=150,500 g/mol and polydispersity index=1.15.

The hydrogenation reaction of the resulting polymer solution is performed with 0.56 mmol of the titanium bis(n-butylcyclopentadienyl)-bis-(4-methoxyphenyl) catalyst per 100 g of polymer. The method and operating conditions for the hydrogenation reaction are the same as in Example 2.

After 25 minutes, the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 97.4% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and no catalyst decomposition products are detected with boiling points below 123° C.

Example 7

Hydrogenation of Styrene-Isoprene Diblock Copolymer

Using the same polymerisation process as in Example 2, a styrene-isoprene linear copolymer (SI) is prepared, with the following composition by weight: styrene (30%) and isoprene (70%) (content in 1,4-polyisoprene: 90%), with Mw=70,154 g/mol and polydispersity index=1.36.

The polymer solution is heated to 100° C. and, subsequently, 1.77 mmol of the titanium bis(n-butylcyclopentadienyl)-bis-(4-methoxyphenyl) catalyst per 100 g of polymer is added. The autoclave is pressurised with hydrogen to 15 bar, and a significant consumption thereof is observed, whilst the temperature of the solution rises to 110° C. After 150 minutes, the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 82.5% of the original isoprene unsaturations are hydrogenated, whereas the styrene unsaturations remain intact; the molecular weight, determined by GPC, indicates that there is no polymer degradation.

The recovered solvent is analysed by the gas chromatography FID detector technique, and no catalyst decomposition products are detected with boiling points below 123° C.

Example 8

Hydrogenation of High-Molecular-Weight Styrene-Butadiene-Styrene Block Copolymer A styrene-butadiene-styrene triblock copolymer in vinyl medium (SBS) at a concentration of 12% by weight in cyclohexane is prepared in a 2 L capacity reactor by the sequential addition of the monomers, using tetrahydrofuran (THF) as the polar modifier and finishing the living polymer with 0.75 mmol of 2,6-di-tert-butyl-4-methylphenol (BHT). The polymer composition by weight is: styrene (25%) and butadiene (75%) (vinyl content in polybutadiene: 33.5%), with Mw=248,000 g/mol and polydispersity index=1.56.

The autoclave reactor that contains the polymer solution is degasified and repeatedly purged with hydrogen. The solution is heated to 90° C. and, subsequently, 0.61 mmol of the titanium bis(n-butylcyclopentadienyl)-bis(4-methoxyphenyl) catalyst per 100 g of polymer is added. The autoclave is pressurised with hydrogen to 10 bar, and a significant consumption thereof is observed, whilst the temperature of the solution rises to 125° C. After 50 minutes, the reaction medium ceases to consume hydrogen, and the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 99.3% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and no catalyst decomposition products are detected with boiling points below 123° C.

Example 9

Catalyst Stability: Time

Using the same polymerisation process as in Example 2, a styrene-butadiene diblock copolymer is prepared, which is subsequently hydrogenated with 0.25 mmol of the titanium bis(n-butylcyclopentadienyl)-bis(4-methoxyphenyl) catalyst per 100 g of polymer. The catalyst used was stored for 75 days at 5° C. prior to being used. The method and operating conditions for the hydrogenation reaction are the same as in Example 2.

After 50 minutes, the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 99.5% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and no catalyst decomposition products are detected with boiling points below 123° C.

Comparative Example 1

Hydrogenation of Styrene-Butadiene Diblock Copolymer with $(Cp)_2Ti(Ph-4-OMe)_2$ The polymer hydrogenation reaction of Example 2 is repeated, using, in this case, 0.25 mmol of the titanium bis(cyclopentadienyl)-bis(4-methoxyphenyl) catalyst per 100 g of polymer. The autoclave is pressurised with hydrogen to 10 bar, and a significant consumption thereof is observed, whilst the temperature of the solution rises to 125° C. After 50 minutes, the reaction medium ceases to consume hydrogen, and the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 99.4% of the original butadiene unsaturations are hydrogenated, whereas the styrene unsaturations remain intact; the molecular weight is determined by GPC, and indicates that there is no polymer degradation.

The recovered solvent is analysed by the gas chromatography FID detector technique, and 267 ppm of cyclopentadiene are detected, which, due to the low boiling point, does not separate from the solvent during the purification step.

Comparative Example 2

Hydrogenation of Styrene-Butadiene Diblock Copolymer with $(Cp)_2Ti(Ph-4-OMe)_2$ at a Low Concentration Using the same polymerisation process as in Example 4, a styrene-butadiene diblock copolymer is prepared, which is subsequently hydrogenated with only 0.17 mmol of the titanium bis(cyclopentadienyl)-bis(4-methoxyphenyl) catalyst per 100 g of polymer. The method and operating conditions for the hydrogenation reaction are the same as in Example 4.

After 55 minutes, the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 99.1% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and 175 ppm of cyclopentadiene are detected, which, due to the low boiling point, does not separate from the solvent during the purification step.

Comparative Example 3

Hydrogenation of High-Molecular-Weight Styrene-Butadiene-Styrene Block Copolymer Using the same polymerisation process as in Example 8, a styrene-butadiene-styrene triblock copolymer in vinyl medium (SBS) is prepared, with the following copolymer composition by weight: styrene (23%) and butadiene (77%)

(vinyl content in polybutadiene: 31%), with Mw=245,000 g/mol and polydispersity index=1.9.

The autoclave reactor that contains the polymer solution is degasified and repeatedly purged with hydrogen. The solution is heated to 90° C. and, subsequently, 0.61 mmol of the titanium bis(cyclopentadienyl)-bis(4-methoxyphenyl) catalyst per 100 g of polymer is added. The autoclave is pressurised with hydrogen to 10 bar, and a significant consumption thereof is observed, whilst the temperature of the solution rises to 125° C. After 50 minutes, the reaction medium ceases to consume hydrogen, and the hydrogenation reaction is considered to be concluded. The reactor is cooled and de-pressurised, and the resulting polymer is separated from the solvent by precipitation in a water-steam mixture, which in turn recovers the solvent. The precipitated polymer is oven-dried and its microstructure analysed by $^1$H-NMR, which indicates that 99.7% of the original butadiene unsaturations are hydrogenated, whereas the styrene unsaturations remain intact; the molecular weight, determined by GPC, indicates that there is no polymer degradation.

The recovered solvent is analysed by the gas chromatography FID detector technique, and 270 ppm of cyclopentadiene are detected, which, due to the low boiling point, does not separate from the solvent during the purification step.

The invention claimed is:

1. A catalyst for the hydrogenation of unsaturated compounds, having the formula:

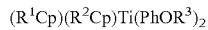

$(R^1Cp)(R^2Cp)Ti(PhOR^3)_2$ wherein:
Cp refers to a cyclopentadienyl;
$R^1$ and $R^2$ are identical or different alkyl groups ($C_3$-$C_{10}$);
Ph refers to a phenyl group, and
$OR^3$ is an alkoxyl group ($C_1$-$C_4$),
wherein the catalyst is a homogenous catalyst and is capable of catalyzing hydrogenation of polymers comprising unsaturated bonds without the presence of a reducing agent.

2. The catalyst, as claimed in claim 1, wherein $R^1$ and $R^2$ are identical or different alkyl groups ($C_3$-$C_6$).

3. The catalyst, as claimed in claim 2, wherein $OR^3$ is a methoxyl or ethoxyl group.

4. The catalyst, as claimed in claim 1, selected from the group consisting of:
titanium bis(n-propylcyclopentadienyl)-bis(4-methoxyphenyl),
titanium bis(n-propylcyclopentadienyl)-bis(4-ethoxyphenyl),
titanium bis(n-propylcyclopentadienyl)-bis(3-methoxyphenyl),
titanium bis(n-propylcyclopentadienyl)-bis(3-ethoxyphenyl),
titanium bis(isopropylcyclopentadienyl)-bis(4-methoxyphenyl),
titanium bis(isopropylcyclopentadienyl)-bis(4-ethoxyphenyl),
titanium bis(isopropylcyclopentadienyl)-bis(3-methoxyphenyl),
titanium bis(isopropylcyclopentadienyl)-bis(3-ethoxyphenyl),
titanium bis(n-butylcyclopentadienyl)-bis(4-methoxyphenyl),
titanium bis(n-butylcyclopentadienyl)-bis(4-ethoxyphenyl),
titanium bis(n-butylcyclopentadienyl)-bis(3-methoxyphenyl),
titanium bis(n-butylcyclopentadienyl)-bis(3-ethoxyphenyl),
titanium bis(n-pentylcyclopentadienyl)-bis(4-methoxyphenyl),
titanium bis(n-pentylcyclopentadienyl)-bis(4-ethoxyphenyl),
titanium bis(n-pentylcyclopentadienyl)-bis(3-methoxyphenyl),
titanium bis(n-pentylcyclopentadienyl)-bis(3-ethoxyphenyl),
titanium bis(n-hexylcyclopentadienyl)-bis(4-methoxyphenyl),
titanium bis(n-hexylcyclopentadienyl)-bis(4-ethoxyphenyl),
titanium bis(n-hexylcyclopentadienyl)-bis(3-methoxyphenyl),
titanium bis(n-hexylcyclopentadienyl)-bis(3-ethoxyphenyl),
titanium (n-propylcyclopentadienyl) (n-butylcyclopentadienyl)-bis(4-methoxyphenyl),
titanium (n-butylcyclopentadienyl) (n-pentylcyclopentadienyl)-bis(4-methoxyphenyl),
titanium (isopropylcyclopentadienyl) (n-butylcyclopentadienyl)-bis(4-methoxyphenyl),
titanium (n-propylcyclopentadienyl) (n-butylcyclopentadienyl)-bis(4-ethoxyphenyl),
titanium (n-butylcyclopentadienyl) (n-pentylcyclopentadienyl)-bis(3-methoxyphenyl), and
titanium (isopropylcyclopentadienyl) (n-butylcyclopentadienyl)-bis(3-ethoxyphenyl).

5. The catalyst, as claimed in claim 1, having the formula: titanium bis(n-butyl cyclopentadienyl)-bis(4-methoxyphenyl).

6. A method for the hydrogenation of a polymer comprising unsaturated bonds, wherein the hydrogenation reaction is a batch, continuous or semi-continuous reaction, wherein the reaction comprises: (a) polymerizing at least one monomer in an inert solvent in the presence of a lithium alkyl to produce polymers or copolymers that contain unsaturated bonds; (b) adding a de-activating compound selected from the group consisting of an alcohol, a phenol, and a chlorosilane to the polymer that is to be hydrogenated, and (c) adding a catalyst of claim 1 to the solution of step (b) in the presence of hydrogen ($H_2$).

7. The method of claim 6, wherein the inert solvent is selected from the group consisting of n-hexane, n-octane, isooctane, cyclohexane, methylcyclopentane, tetrahydrofuran, benzene, toluene, xylene, ethylbenzene, and mixtures thereof.

8. The method of claim 6, wherein the hydrogenation takes place at a temperature between 50° C. and 140° C., with a hydrogen pressure between 4 bar and 25 bar.

9. The method of claim 6, wherein the quantity of catalyst is between 0.01 and 2 mmol per 100 g of polymer to be hydrogenated.

10. The method of claim 6, wherein the polymer to be hydrogenated is a copolymer consisting of: (a) a monomer selected from the group consisting of 1,3-butadiene, isoprene, and mixtures thereof; and (b) a monomer selected from the group consisting of styrene, α-methylstyrene, a 4-alkylstyrene, and mixtures thereof.

11. The method of claim 10, wherein the copolymer is a random copolymer, or a pure or gradual block copolymer, and wherein the copolymer is linear, branched, radial or any combinations thereof.

12. The method of claim 11, wherein the copolymer comprises a block copolymer and wherein the block copolymer comprises at least one polymer block A comprising a monomer selected from the group consisting of styrene, a 4-alkylstyrene, and mixtures thereof, and at least one polymer block B comprising a monomer selected from the group consisting of 1,3-butadiene, isoprene, and mixtures thereof.

13. The method of claim 12, wherein the proportion of block A of the copolymer is between 10% and 90% of the final copolymer by weight and the proportion of 1,2-vinyl units in block B is between 8% and 90% by weight.

14. The method of claim 6, wherein the polymer to be hydrogenated is a copolymer consisting of: (a) a monomer selected the group consisting of 1,3-butadiene isoprene, and mixtures thereof; and (b) a monomer selected from the group consisting of styrene, a 4-alkylstyrene, and mixtures thereof, and wherein more than 50% of the 1,3-butadiene or the isoprene units and less than 1% of the styrene or the 4-alkylstyrene units are hydrogenated.

15. The method of claim 14, wherein more than 95% of the 1,3-butadiene or isoprene units and less than 1% of the styrene or 4-alkylstyrene units are hydrogenated.

16. The method of claim 6, wherein the polymer to be hydrogenated is a copolymer consisting of: (a) a monomer selected the group consisting of 1,3-butadiene, isoprene, and mixtures thereof; and (b) a monomer selected from the group consisting of styrene, a 4-alkylstyrene, and mixtures thereof, and wherein hydrogenation is effected selectively on at least: i. more than 50% of the unsaturated bonds of the 1,3-butadiene or the isoprene units, and ii. less than 1% of the unsaturated bonds of the styrene or the 4-alkylstyrene units.

17. The method of claim 6, wherein the polymer to be hydrogenated is a copolymer consisting of: (a) a monomer selected the group consisting of 1,3-butadiene, isoprene, and mixtures thereof; and (b) a monomer selected from the group consisting of styrene, a 4-alkylstyrene, and mixtures thereof, and wherein hydrogenation is effected selectively on at least: i. more than 95% of the unsaturated bonds of the 1,3-butadiene or the isoprene units, and ii. less than 1% of the unsaturated bonds of the styrene or the 4-alkylstyrene units.

18. The method of claim 6, wherein the polymer to be hydrogenated is a copolymer consisting of: (a) a monomer selected the group consisting of 1,3-butadiene, isoprene, and mixtures thereof; and (b) a monomer selected from the group consisting of styrene, a 4-alkylstyrene, and mixtures thereof, and wherein hydrogenation is effected selectively: i. between 50% and 99.9% of the unsaturated bonds of the 1,3-butadiene or the isoprene units, and ii. between 0.01% and 1% of the unsaturated bonds of the styrene or the 4-alkylstyrene units.

19. The method of claim 6, wherein the polymer to be hydrogenated is a copolymer consisting of: (a) a monomer selected the group consisting of 1,3-butadiene, isoprene, and mixtures thereof; and (b) a monomer selected from the group consisting of styrene, a 4-alkylstyrene, and mixtures thereof, and wherein hydrogenation is effected selectively: i. between 95% and 99.9% of the unsaturated bonds of the 1,3-butadiene or the isoprene units, and ii. between 0.01% and 1% of the unsaturated bonds of the styrene or the 4-alkylstyrene units.

* * * * *